United States Patent
Mousty et al.

(10) Patent No.: US 6,763,246 B2
(45) Date of Patent: Jul. 13, 2004

(54) PORTABLE CORDLESS TELEPHONE HAVING AN IMPROVED RINGING DEVICE

(75) Inventors: David Mousty, Mezieres S/Lavardin (FR); Etienne Carriere, Le Mans (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 408 days.

(21) Appl. No.: 09/824,618

(22) Filed: Apr. 2, 2001

(65) Prior Publication Data

US 2001/0034252 A1 Oct. 25, 2001

(30) Foreign Application Priority Data

Apr. 4, 2000 (FR) .......................................... 00 04289

(51) Int. Cl.[7] ................................................ H04B 1/38
(52) U.S. Cl. ...................... 455/550.1; 455/567; 381/61; 381/103
(58) Field of Search .............................. 455/550.1, 567, 455/575.1, 462; 381/61, 77, 98, 103, 101

(56) References Cited

U.S. PATENT DOCUMENTS 4,649,783 A * 3/1987 Strong et al. ................. 84/606
5,812,677 A * 9/1998 Tamaru ........................ 381/61
6,246,761 B1 * 6/2001 Cuddy ......................... 379/418

OTHER PUBLICATIONS

Patent Abstract of Japan: Publication No. 09101786, Application No.: 07258019, Date of Publication: Apr. 15, 1997.

* cited by examiner

Primary Examiner—William Trost
Assistant Examiner—Joseph D Nguyen
(74) Attorney, Agent, or Firm—Jack D. Slobod

(57) ABSTRACT

A portable apparatus including an acoustic signal generation device mainly comprises an input unit (IU) adapted to supply a digital input signal (in). The apparatus further comprises a delay line (DL) adapted to receive N samples of the digital input signal, to store and delay data values associated with the samples. The apparatus also comprises an arithmetic unit (AU) adapted to combine at least two delayed data values received from the delay line in order to them a modified data value, which is again loaded into the delay line and delayed by the value N, the modified data values together also forming an output signal (s), whose frequency content includes the fundamental frequency of the signal to be produced, enriched with harmonics of different intensities. The portable apparatus finally comprises an output unit (OU) adapted to produce a musical sound on the basis of said output signal.

11 Claims, 2 Drawing Sheets

PORTABLE CORDLESS TELEPHONE HAVING AN IMPROVED RINGING DEVICE

Figure 1:
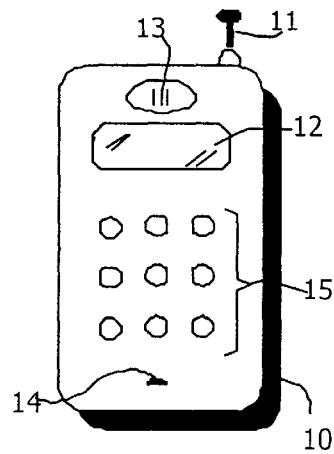

The present invention relates to a portable apparatus including an acoustic signal generation device.

A portable apparatus can be, for example, a portable cordless telephone operating in a digital telecommunication system of the DECT type or in a mobile radiocommunication system of the GSM type.

The Japanese patent specification no. 9101786A describes a portable cordless telephone including an acoustic signal generation device by means of which melodies can be generated with the aid of a digital signal processor although only minimal memory means are used. The melody generation device has a data memory which stores the data relating to the melody such as the notes. A controller sequentially reads out the data relating to the notes. A sound generator produces a periodic source signal having the frequency of the note. An envelope generator produces an envelope signal which is combined with the source signal in order to generate the melody.

The prior-art device for generating the acoustic signal has the drawback that it generates a melody of poor musical sonority, which is therefore not pleasant to listen to for the user.

It is an object of the invention to remedy this drawback by proposing a portable apparatus having an acoustic signal generation device producing a pleasant sound.

To this end, the present invention proposes a portable apparatus including an acoustic signal generation device comprising:
  an input unit for supplying a digital input signal,
  a delay line for initially receiving N samples of the digital input signal, the value N being dependent on the fundamental frequency of the acoustic signal to be produced, for storing and delaying data values associated with the samples,
  an arithmetic unit for combining at least two delayed data values received from the delay line in order to form a modified data value, which is again stored in the delay line and delayed by the period N, the modified data values together also forming an output signal,
  an output unit for producing the acoustic signal on the basis of said output signal.

Such an acoustic signal generation device enables the frequency content of digital input signal initially fed into the delay line to be modified in a simple manner owing to the arithmetic unit. The sound timbre obtained at the output of the acoustic signal generation device is found to be richer as a result of the presence of harmonics in addition to the fundamental frequency of the acoustic signal. The portable apparatus including such a device thus enables the generation of melodies which are more pleasant to listen to, the sounds produced being closer to natural sounds, in contradistinction to conventional portable apparatuses, which generate sounds of musically poor quality based on sinusoidal signals.

The present invention also proposes a portable apparatus including an acoustic signal generation device comprising:
  up-sampling means for computing an up-sampling frequency on the basis of the fundamental frequency of the acoustic signal to be produced, of a sampling frequency at which the output signal should be supplied, and of a maximum length of the delay line, the data being processed by the delay line and the arithmetic unit at the up-sampling frequency thus determined,
  down-sampling means for down-sampling the output signal sampled at the up-sampling frequency in order to supply an output signal sampled at the sampling frequency to the output unit.

By means of such a device it is possible to optimize the content of the delay line and, as a consequence, the processing of the digital input signal by the delay line in conjunction with the arithmetic unit as a function of the fundamental frequency of the acoustic signal to be generated.

Figure 2:
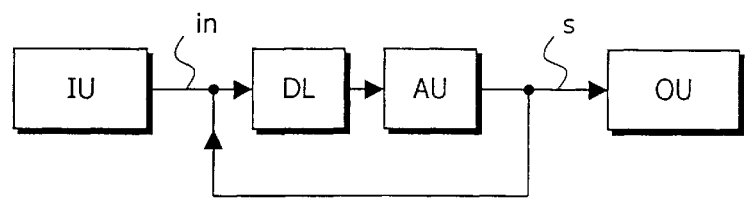
Figure 3:
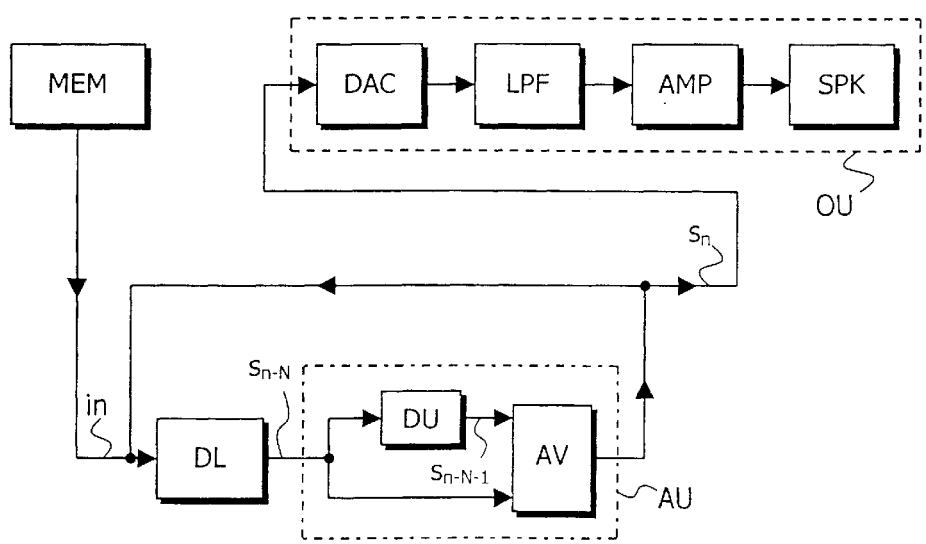
Figure 4:
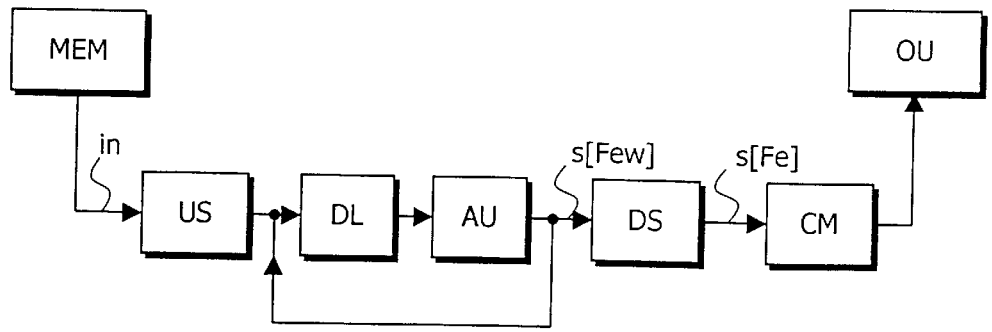
Figure 5:
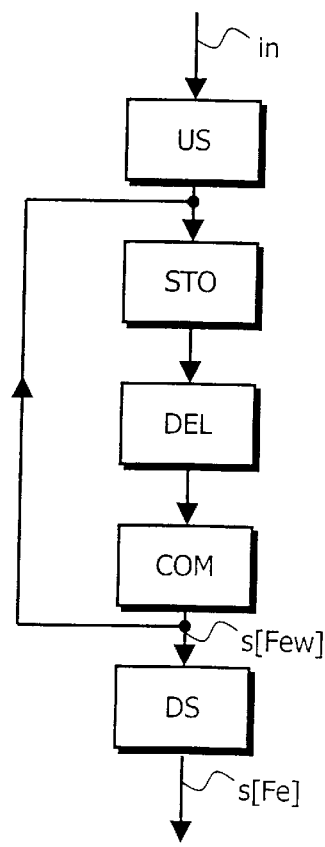

These aspects of the invention as well as more detailed other aspects will become apparent more clearly from the following description of a number of embodiments of the invention, which are given by way of example, with reference to the accompanying drawings, in which:

FIG. 1 is a diagrammatic representation of a portable apparatus in accordance with the invention, FIG. 2 is a diagrammatic representation of the acoustic signal generation device contained in the portable apparatus in accordance with the invention, FIG. 3 is a diagrammatic representation of an embodiment of an acoustic signal generation device, FIG. 4 is a diagrammatic representation of an improvement of the embodiment shown in FIG. 3, and FIG. 5 is a block diagram of a method of generating an acoustic signal in accordance with the invention.

FIG. 1 is a diagrammatic representation of a portable apparatus in accordance with the invention. Here, said portable apparatus 10 is a portable telephone comprising an antenna 11, a screen 12, an earphone 13, a microphone 14, a keyboard 15 and including an acoustic signal generation device, which is not shown in this figure. The present invention is not limited to this type of portable apparatus and can also be applied to any other type of portable apparatus having a ringing device and limited computing resources, such as for example personal digital assistants.

FIG. 2 illustrates the operating principle of the acoustic signal generation device. Such an acoustic signal generation device mainly includes:
  an input unit (IU) adapted to supply a digital input signal (in), which input unit is, for example, a memory in which a reference signal is stored,
  a delay line (DL) adapted:
    to be initially loaded with N samples of the digital input signal, the value N being dependent on the fundamental frequency of an acoustic signal to be produced,
    to store and cyclically delay data values associated with the samples,
  an arithmetic unit (AU) adapted to combine at least two delayed data values received from the delay line in order to form a modified data value, which is again loaded into the delay line and delayed by the period N, the modified data values together also forming an output signal (s) whose frequency content includes the fundamental frequency of the signal to be produced, enriched with harmonics of different intensities,
  an output unit (OU) adapted to produce a pleasant musical sound on the basis of the output signal by converting it into an acoustic signal which is audible for the user.

In the preferred embodiment shown in FIG. 3 the input unit (IU) comprises a memory (MEM) which stores the reference signal (in). This reference signal is made up of samples whose average value is zero and which represent white noise. This signal forms the input signal of the main delay line (DL).

The main delay line can initially be loaded with the N samples of the digital input signal but can also store them and delay them by the period N, so as to supply delayed samples ($s_{n-N}$) to the arithmetic unit. The length N of the main delay line that is used dictates the frequency fp of the note to be played. For example, to play the note C3 of the fundamental frequency $f_{C3}$=130.80 Hz, the required number N of samples is equal to Fe/$f_{C3}$, i.e. 244 samples.

The arithmetic unit (AU) includes a unit delay line (DU) having a length of one unit and an averaging unit (AV) which, at a sampling instant n, receives the samples $S_{n-N}$ from the main delay line and $s_{n-N-1}$ from the unit delay line. The averaging unit then determines the data value of the sample $s_n$ of the output signal (s) in the following manner:

$$s_n = C_{sustain} \times (s_{n-N} + s_{n-N-1})$$

where $C_{sustain}$ is a sustain coefficient.

By means of such an algorithm it is possible to obtain an acoustic signal of the fundamental frequency fp comprising harmonics of fp of different intensities, which acoustic signal has a sound quality close to that of sounds produced by musical instruments. In the preferred embodiment the sustain coefficient is equal to ½ or very close to this value, as a result of which the output of the acoustic signal generation device is a sound resembling the sound produced by a guitar.

However, it will be apparent to one skilled in the art that the invention is not limited to the combination of the two delayed samples described hereinbefore but that it can be applied to any combination of two or more delayed samples, if required from other delay lines or by modification of the function realized by means of the averaging unit. Nevertheless, the solution corresponding to the preferred embodiment has the advantage that it requires a small computing capacity.

In order to be converted into an audible signal the output signal from the arithmetic unit is applied to the output unit (OU). This output unit comprises in series:
- a digital-to-analog converter (DAC), which converts the digital output signal into an analog output signal,
- a low-pass filter (LPF) which eliminates undesired frequencies in the analog output signal caused, in particular, by noise,
- an amplifier (AMP), which amplifies the analog output signal, and
- a loudspeaker (SPK), which produces the desired musical sound.

FIG. 4 shows an improved version of the embodiment shown in FIG. 3. In this second embodiment the reference signal (in) stored in the memory (MEM) represents white noise comprising 128 samples encoded in 16 bits. This reference signal has an average value of zero and, in order to save memory space, it is fixed once and for all for the given application.

The reference signal is loaded one or more times into the delay line (DL) whose maximum length Nmax is also dictated by the application: it is equal to 256 samples in this second embodiment, which samples, i.e. the sound amplitude, are encoded in 16 bits.

The arithmetic unit (AU) should supply the output signal (s[$F_e$]) to the output unit (OU) at a given sampling frequency Fe, which is 32 kHz in the present case. If the data processing by the delay line and the arithmetic unit is effected at the sampling frequency Fe, the high frequency notes will utilize a small part of the delay line and the acoustic signal resulting from the processing by the combination of the delay line and the arithmetic unit will not be of a high quality. Actually, the number of samples N supplied to the delay line by the input unit in order to generate a note of a frequency fp is equal to:

$$N = Fe/fp,$$ where/is the division which yields a value for N rounded off to the nearest integer.

When the frequency fp increases the number N of samples decreases, as a result of which the delay line is filled to an increasingly smaller extent and the notes of higher frequency are consequently processed less satisfactorily. Thus, to reproduce the note D5 of the fundamental frequency $f_{D5}$=587.40 Hz, the number N of samples will be equal to Fe/$f_{D5}$, i.e. 54 samples, which represents less than a quarter of the maximum length Nmax of the delay line.

This second embodiment aims at adapting the frequency of the data processing by the delay line and the arithmetic unit dynamically as a function of the fundamental frequency fp of the acoustic signal to be generated, allowance being made for restrictions imposed by the maximum length Nmax of the delay line and the sampling frequency Fe of the output signal. Thus, this embodiment enables the filling of the delay line for high frequencies to be optimized and, as a consequence, the sound quality of said frequencies to be improved.

For this purpose, the acoustic signal generation device shown in FIG. 4 includes up-sampling means (US). These up-sampling means enable the data to be processed at an up-sampling frequency Few higher than the sampling frequency Fe in order to obtain a better accuracy of the results. For this, the up-sampling means calculate a multiplication factor K by means of which it is possible to change over from the sampling frequency Fe to the up-sampling frequency Few: Few=K×Fe. Said up-sampling means ensure an optimum filling of the delay line in the following manner: when N is the number of samples corresponding to the up-sampling frequency Few, this yields:

$$N = Few/fp.$$

The factor K is calculated by maximizing the value N, care being taken that this value remains below Nmax. For practical reasons the factor K is chosen to be equal to a power of 2 in the second embodiment, i.e.:

K=$2^i$, where i is an integer, which is calculated as follows:
i=threshold ($\log_2$(fp×Nmax/Fe))
where threshold (x) is the function yielding the rounded integer value of x and $\log_2$(x) is the function yielding the logarithm of x to the base 2.

Thus, to reproduce the note D5 of the frequency $f_{D5}$=587.40 Hz, the value of the factor K is 4, which corresponds to an up-sampling frequency of 128 kHz, and the number N of samples is equal to Few/$f_{D5}$, i.e. 217 samples instead of the 54 samples that would have been used with a sampling frequency Fe of 32 kHz. To one skilled in the art it will be apparent that a factor K that differs from a power of 2 such as, for example, K=fp×Nmax/Fe is likewise possible. However, such a solution requires more complex calculation means than those used in the embodiment described here.

The acoustic signal generation device also includes down-sampling means (DS), which enable the output signal s[Few], which has been sampled at the up-sampling frequency Few, to be down-sampled in order to obtain an output signal s[Fe] sampled at the sampling frequency Fe. Since the factor K is a power of 2 the down-sampling means in accordance with the invention include successive decimation filters.

This second encoding method aims at avoiding parasitic effects during transitions between a note of decreasing amplitude and a pause, which transitions manifest themselves in a clicking sound.

Actually, the delay line is initialized with N data values from the memory (MEM), regardless of the fundamental frequency fp of the note. Consequently, for a given note the number N of samples of the digital input signal (in) loaded into the delay line (DL) may differ from a multiple of 128, the digital input signal comprising 128 samples whose average value is zero. Thus, the delay line contains samples which may have a non-zero average value and the generated output signal (s) then has a direct component d.c., which is perceived by the user as a clicking sound, at the transitions between a signal of decreasing amplitude and a pause. In order to suppress this undesired d.c. component the acoustic signal generation device includes correction means (CM), which calculate the average value of the data values present in the delay line and which subtract this average value from the data values of the output signal sampled at the up-sampling frequency or at the sampling frequency.

A portable cordless telephone including an acoustic signal generation device thus makes it possible to generate melodies of a quasi-natural sound quality close to that produced by musical instruments and therefore far more pleasant to the ear of the user than produced by conventional ringing devices, for example by portable telephones currently available on the market.

FIG. 5 is a block diagram of a method of generating an acoustic signal (s) from a digital input signal (in). Said method comprises the following steps of:

storing (STO) data values associated with N samples of the digital input signal in a table, the value N being dependent on the fundamental frequency of the acoustic signal to be produced, delaying (DEL) the data values stored in the table, combining (COM) at least two delayed values from the table in order to form a modified data value, which is again stored into the table and delayed by the value N, the modified data values together also forming the output signal.

The method further comprising the steps of:

up-sampling (US) in which an up-sampling frequency is calculated on the basis of the fundamental frequency of the acoustic signal to be produced, on the basis of a sampling frequency at which the output signal is to be supplied, and on the basis of a maximum length of the table, processing of the data being effected by the storage and combination steps at the up-sampling frequency thus determined, down-sampling (DS), in which the output signal sampled at the up-sampling frequency (s[Few]) is down-sampled in order to supply an output signal sampled at the sampling frequency (s[Fe]).

The different steps described hereinabove are implemented in more detail as described with reference to FIGS. 3 and 4.

It is possible to implement these steps using an integrated circuit which is suitably programmed. A set of instructions contained, for example, in a computer programming memory may cause the integrated circuit to carry out the different steps of the acoustic signal generation method. The set of instructions may be loaded into the programming memory by reading a data carrier such as, for example, a disk. The set of instructions can also be made available by a service provider via a communication network such as, for example, the Internet.

Any reference sign in a claim should not be construed as limiting the claim. It is to be noted that the use of the verb "to comprise" and its conjugations does not exclude the presence of any elements or steps other than those defined in a claim. The indefinite article "a" or "an" preceding an element or step does not exclude the presence of a plurality of said elements or steps.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A portable apparatus including an acoustic signal generation device comprising:

an input unit (IU) for supplying a digital input signal (in);

a delay line (DL) for initially receiving N samples of the digital input signal, the value N being dependent on the fundamental frequency of the acoustic signal to be produced, for storing and delaying data values associated with the samples;

an arithmetic unit (AU) for combining at least two delayed data values received from the delay line in order to form a modified data value, which is again stored in the delay line and delayed by the period N, the modified data values together also forming an output signal (s); and an output unit (OU) for producing the acoustic signal on the basis of said output signal.

2. The portable apparatus as claimed in claim 1, wherein said acoustic signal generation device also comprises:

up-sampling means (US) for calculating an up-sampling frequency on the basis of the fundamental frequency of the acoustic signal to be produced, of a sampling frequency at which the output signal should be supplied, and of a maximum length of the delay line (DL), the data being processed by the delay line and the arithmetic unit (AU) at the up-sampling frequency thus determined; and down-sampling means (DS) for down-sampling the output signal sampled at the up-sampling frequency (s[Few]) in order to supply an output signal sampled at the sampling frequency (s[Fe]) to the output unit.

3. The portable apparatus as claimed in claim 1, including correction means (CM) for calculating an average value of the data values present in the delay line and subtracting this average value from the data values of the output signal.

4. The portable apparatus as claimed in claim 1, wherein the data value of a sample of the output signal at a sampling instant n ($s_n$) is equal to an average value of a data value delayed by N ($s_{n-N}$) and a data value delayed by N+1 ($s_{n-N-1}$).

5. A device for generating an acoustic signal from a digital input signal (in), said device comprising:

a delay line (DL) for initially receiving N samples of the digital input signal, the value N being dependent on the fundamental frequency of the acoustic signal to be produced, for storing and delaying data values associated with the samples;

an arithmetic unit (AU) for combining at least two delayed data values received from the delay line in order to form a modified data value, which is again stored in the delay line and delayed by the period N, the modified data values together also forming an output signal;

up-sampling means (US) for calculating an up-sampling frequency on the basis of the fundamental frequency of the acoustic signal to be produced, on the basis of a sampling frequency at which the output signal is to be supplied, and on the basis of a maximum length of the delay line, the data being processed by the delay line and the arithmetic unit at the up-sampling frequency thus determined; and down-sampling means (DS) for down-sampling the output signal sampled at the up-sampling frequency (s[Few]) in order to supply an output signal sampled at the sampling frequency (s[Fe]) to an output unit (OU) adapted to produce the acoustic signal.

6. The acoustic signal generation device as claimed in claim 5, including correction means (CM) for calculating an average value of the data values present in the delay line and subtracting this average value from the data values of the output signal.

7. The acoustic signal generation device as claimed in claim 5, wherein the data value of a sample of the output signal at a sampling instant n ($s_n$) is equal to an average value of a data value delayed by N (sn-N) and a data value delayed by N+1(sn-N-1).

8. A method of processing a digital input signal (in) for generating an output signal (s[Fe]) to be converted into an acoustic signal, said method comprising:

a step of storing (STO) data values associated with N samples of the digital input signal in a table, the value N being dependent on the fundamental frequency of the acoustic signal to be produced;

a step of delaying (DEL) the data values stored in the table;

a step of combining (COM) at least two delayed values from the table in order to form a modified data value, which is again stored in the table and delayed by the value N, the modified data values together also forming the output signal;

a step of up-sampling (US), for calculating an up-sampling frequency on the basis of the fundamental frequency of the acoustic signal to be produced, on the basis of a sampling frequency at which the output signal is to be supplied, and on the basis of a maximum length of the table, processing of the data being effected by the storage and combination steps at the up-sampling frequency thus determined; and a step of down-sampling (DS) the output signal sampled at the up-sampling frequency (s[Few]) in order to supply an output signal sampled at the sampling frequency (s)[Fe]).

9. The method of processing as claimed in claim 8, further comprising a correction step (CM) for calculating an average value of the data values present in the delay line and subtracting this average value from the data values of the output signal.

10. The method of processing as claimed in claim 8, wherein the data value of a sample of the output signal at a sampling instant n (sn) is equal to an average value of a data value delayed by N (sn-N) and a data value delayed by N+1(sn-N-1).

11. A computer program product, which comprises a set of instructions which, when loaded into a portable apparatus, cause the portable apparatus to carry out the processing method as claimed in claim 8.

* * * * *